United States Patent [19]

Jäger et al.

[11] Patent Number: 4,752,708
[45] Date of Patent: Jun. 21, 1988

[54] END WINDING SUPPORT FOR ELECTRIC MACHINES

[75] Inventors: Kurt Jäger, Mannheim; Peter Ehrt, Einhausen, both of Fed. Rep. of Germany

[73] Assignee: Brown, Boveri & Cie AG, Mannheim, Fed. Rep. of Germany

[21] Appl. No.: 30,739

[22] Filed: Mar. 25, 1987

[30] Foreign Application Priority Data

Mar. 26, 1986 [DE] Fed. Rep. of Germany ....... 3610265

[51] Int. Cl.$^4$ ............................................. H02K 3/46
[52] U.S. Cl. .................................... 310/260; 310/270
[58] Field of Search ................. 310/260, 270, 43, 254, 310/271

[56] References Cited

U.S. PATENT DOCUMENTS 3,988,625 10/1976 Jäger et al. ....................... 310/260

FOREIGN PATENT DOCUMENTS 2161139 6/1973 Fed. Rep. of Germany .
2606484 8/1977 Fed. Rep. of Germany .
  87614 11/1972 German Democratic Rep. .
1289828 9/1972 United Kingdom .

*Primary Examiner*—Donovan F. Duggan
*Attorney, Agent, or Firm*—Herbert L. Lerner; Laurence A. Greenberg

[57] ABSTRACT

An apparatus for supporting conductor bars of an end winding of a stator winding of an electric machine having a lamination stack includes pressure plates holding the lamination stack together, support angles supporting the conductor bars in the vicinity of the end winding, a support ring being directly axially adjacent the pressure plate and having an inner periphery, the support angles having radially outer surfaces braced against the support ring, the support angles being guided and partially disposed in radially extending slots formed in the pressure plates, and spacers in the shape of ring segments resting on the inner periphery of the support ring and preventing tangential deflection of the support angles.

6 Claims, 5 Drawing Sheets

END WINDING SUPPORT FOR ELECTRIC MACHINES

The invention relates to an apparatus for supporting the end windings of the stator winding of an electric machine, particularly a turbo generator of great axial length, including pressure plates holding the lamination stack together, and support angles facing the conductor bars in the vicinity of the end windings, which in turn have radially outer surfaces braced against the support ring.

The stator end windings of electric synchronous machines need support so that they can withstand large forces which can occur particularly in the event of short circuits. During the construction of the support, provisions must be made for permitting the winding parts to move freely in the axial direction of the machine, in such a manner that they can readily follow thermal expansions.

An apparatus of the type mentioned above has become known from German Patent DE-PS No. 12 86 198. In that device, elements for supporting the end surface connections are disposed at a relative large spacing from the lamination stack, i.e. relatively close to bends in the end surface. The end surface connections are braced against the machine housing through support angles and a support ring. In order to permit free axial movement of the end windings, rolling bodies are disposed between the support ring and the machine housing. The end winding support still requires a relatively large amount of planning or design and assembly effort. In particular, accessibility is limited during the performance of wrapping operations.

The support angles have therefore been bolted through fastening elements to the pressure plate of the lamination stack. In such a device, the support angles are rigidly connected to the stator end winding by impregnated fiberglass cords or ropes and form a unit. They are braced against the pressure plate. In the paper by Otto Fluhr et al entitled "Luftgekühlte Turbogeneratoren für 18 ... 130 MVA, Typen WX und WY" [Air Cooled Turbo Generators for 18 to 130 MVA, Types WX and WY]in Brown, Boveri Mitt. 6-1976, pages 392 to 398, an end winding support is shown in FIG. 2, in which every support angle is bolted to the pressure plate by two L-shaped angle brackets serving as transition pieces. The screw connections are elastic in the axial direction so that the stator winding can expand relative to the lamination stack. Such an end winding support thus requires a multiplicity of of elastic screw connections with relatively high manufacturing and assembly costs.

It is accordingly an object of the invention to provide an end winding support for electric machines, which overcomes the hereinafore-mentioned disadvantages of the heretofore-known devices of this general type, in such a way that an end winding support is created which is rigid in itself in the radial and tangential directions, is movable in the axial direction, only requires a few easy to manufacture parts, is "assembly friendly" and largely dispenses with the use of fastening parts such as screws and securing elements which bring with them the danger of loosening.

With the foregoing and other objects in view there is provided, in accordance with the invention, an apparatus for supporting conductor bars of an end winding of a stator winding of an electric machine having a lamination stack, comprising pressure plates holding the lamination stack together, support angles supporting the conductor bars in the vicinity of the end winding, a support ring being directly axially adjacent said pressure plate and having an inner periphery, said support angles having radially outer surfaces braced against said support ring, said support angles being guided and partially disposed in radially extending slots formed in said said pressure plates, and spacers in the shape of ring segments resting on said inner periphery of said support ring and preventing tangential deflection of said support angles.

The support angles are freely movable in the radial direction in the slots of the pressure plate. The depths of the slots in the pressure plate are adjusted in such a manner that in the event of an axial displacement of the end winding due to thermal expansion of the conductor bars, the support angles remain at least partially in the range where they are influenced by the slots. The radial forces of the winding are introduced into the support ring through support angles. Due to the placement of the support ring in the immediate vicinity of the pressure plate, the support ring can take up the radial forces and need not be braced in turn against the machine housing. A tangential deflection of the support angles is prevented on one hand by the guidance in the slots of the pressure plate and on the other hand by the placement of the spacers. The axial mobility of the end winding is assured.

As compared to the conventional end winding supports, the apparatus according to the invention has the advantage of only requiring a few easy to manufacture parts. Thus, besides the support angles which are required anyway, only a simple-to-manufacture support ring and simple spacers are required. Radial bracing of the end winding at the machine housing can be dispensed with. The parts of the winding are easily accessible so that wrapping work is not interfered with. Furthermore, fastening elements such as screws, bolts etc. for fastening the support angles can be completely dispensed with. The end winding support according to the invention can be manufactured less expensively and with fewer parts than heretofore and avoids the danger of loosening fastening parts.

In accordance with another feature of the invention, the pressure plate has a circular slot formed therein concentric with the axis of the electric machine, said spacers protruding at least partially into said circular slot. Centering of the end winding is obtained in this way.

In accordance with a further feature of the invention, one of said spacers is disposed between and rests against two adjacent support angles. This is done in order to assure tangential securing of the support angles in their radially outer region. One end of each spacer rests against one of the two support angles. With this embodiment, the entire inside periphery of the support ring is occupied either by parts of the support angle or by spacers.

Due to the total coverage of the inner periphery of the support ring by support angles and spacers, division errors during the manufacture of the parts can lead to problems. Therefore, in accordance with an added feature of the invention, one of said spacers has a surface facing the axis of the electric machine having an axial longitudinal slot formed therein, one of said support angles having a radially outwardly pointing part at least partly engaged in said axial longitudinal slot. With this embodiment, gaps between two adjacent spacers can remain.

In accordance with an additional feature of the invention, one of the spacers is adhesively connected to a support ring. While in principle a screw connection is also possible, cementing or adhesive connection facilitates assembly and prevents the disadvantages connected with a screw connection. The cementing or adhesive connection, which can be performed, for instance, with cold-setting casting resin, is as a rule sufficient for transmitting the forces that occur.

During the construction of the end winding support, on the one hand, the support ring can be rigidly connected to the lamination stack, so that only the conductor parts jointly with the support angles can execute a radial temperature compensation motion. On the other hand, the conductor bars with the support angles, the spacers and the support ring can also be combined into a rigid unit, which is axially movable.

In the former case, in accordance with yet another feature of the invention, the support ring is bolted to the lamination body. In such a case, the support ring can be bolted, for instance, to the pressure plate. However, it is also possible to bolt the support ring to the wedge supports which serve for clamping the lamination stack or are welded to the lamination body.

If the entire end winding support is constructed as a unit, in accordance with a concomitant feature of the invention, the support angles, the spacers and the support ring are adhesively connected together to form a mechanical unit. Other features which are considered as characteristic for the invention are set forth in the appended claims.

Although the invention is illustrated and described herein as embodied in an end winding support for electric machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
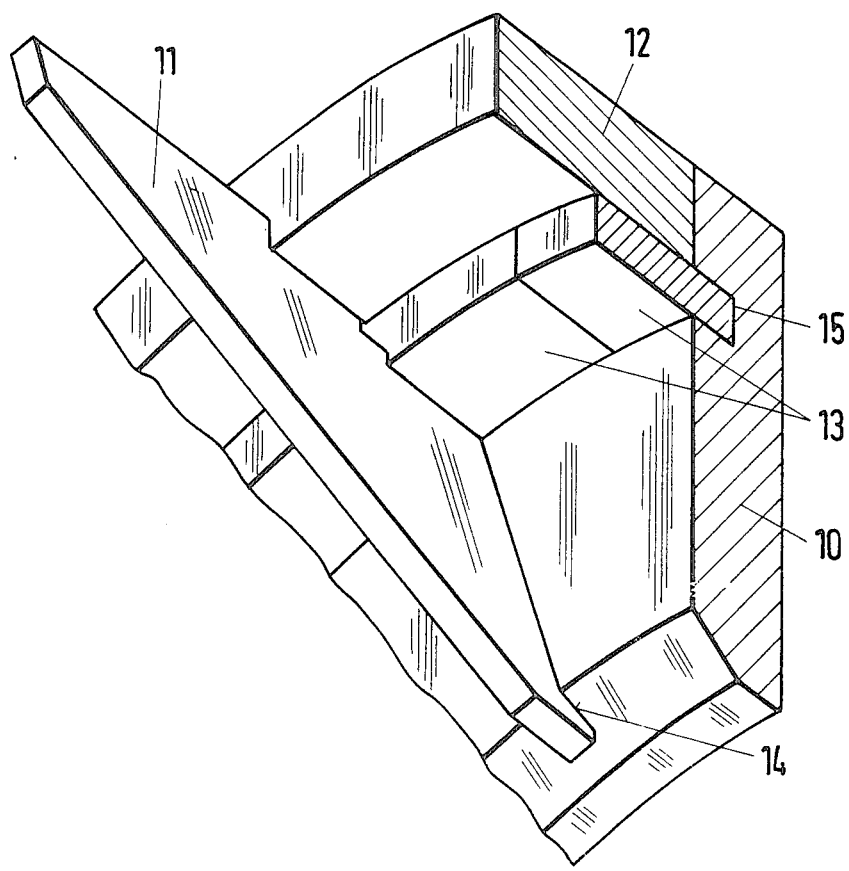
FIG. 1 is a fragmentary, diagrammatic, perspective view of an apparatus for supporting an end winding according to the invention.

Referring now to the figures of the drawings in detail and first, particularly, to FIG. 1 thereof, there are seen elements of a subregion of the end winding support. The elements include a pressure plate 10 which can be constructed in the form of a pressure ring or in the form of segments; a support angle 11 which is one of a large number of support angles disposed over the entire circumference of the end winding; a support ring 12; and two subsections of spacers 13. The support angle 11 partially engages in a slot 14 in the pressure plate 10. The support angle 11 can be moved in the slot 14 in the radial direction. The spacers 13 are partially disposed in a ring slot 15 in the pressure plate 10.

The pressure plate 10 may be formed of metal, for instance, while the support angles 11, the spacers 13 and the support ring 12 can be made of fiberglass-reinforced plastic. The support angles 11, spacers 13 and support ring 12 are cemented or adhesively connected to each other in order to form a unit and they are rigidly connected to the non-illustrated turns of the end winding. The unit is not fixed in the axial direction and therefore permits axial temperature equalization motions of the stator winding. Radial forces on the end winding are taken up substantially by the support ring 12. The end winding is centered due to the support of the spacers 13 in the circular slot 15. Tangential forces which act on the support angle 11, are taken up by the support in the slots 14 and 15 and by the spacers 13.

Figure 2:
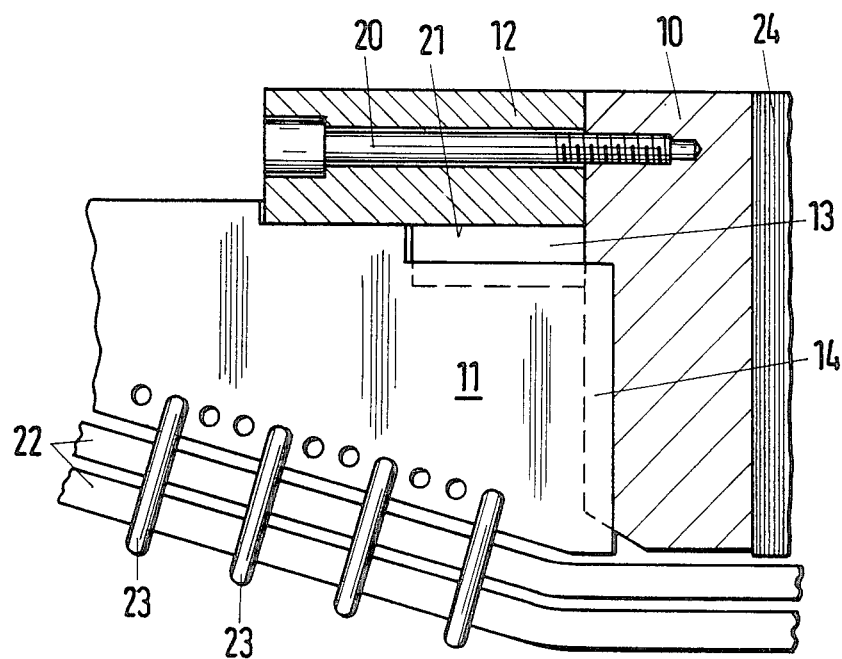
FIG. 2 is a fragmentary, partially cross-sectional, side-elevational view of an end winding support according to the invention.

FIG. 2 shows a similar end winding support. The same or comparable parts have therefore been designated with the same reference symbols as in FIG. 1. In contrast to FIG. 1, the support ring 12 according to FIG. 2 is bolted to the pressure plate 10 by means of bolts 20, one of which is shown. The spacers 13 are cemented or adhesively connected to the support ring 12. The cementing or adhesive connection 21 can be performed, for instance, by a cold-setting casting resin.

FIG. 2 also shows conductor bars 22 of the stator end winding which are connected to the support angle 11 by impregnated fiberglass cords or ropes 23. While the support ring 12 and the spacers 13 are rigidly connected to the pressure plate 10 and a lamination stack 24, the stator end winding with the support angles 11 can be moved in the axial direction. The support angles 11 do not leave the slots 14 completely during the axial motion occurring in this connection. The support angles 11 are secured by the support ring 12 in the radial direction.

Figure 3:
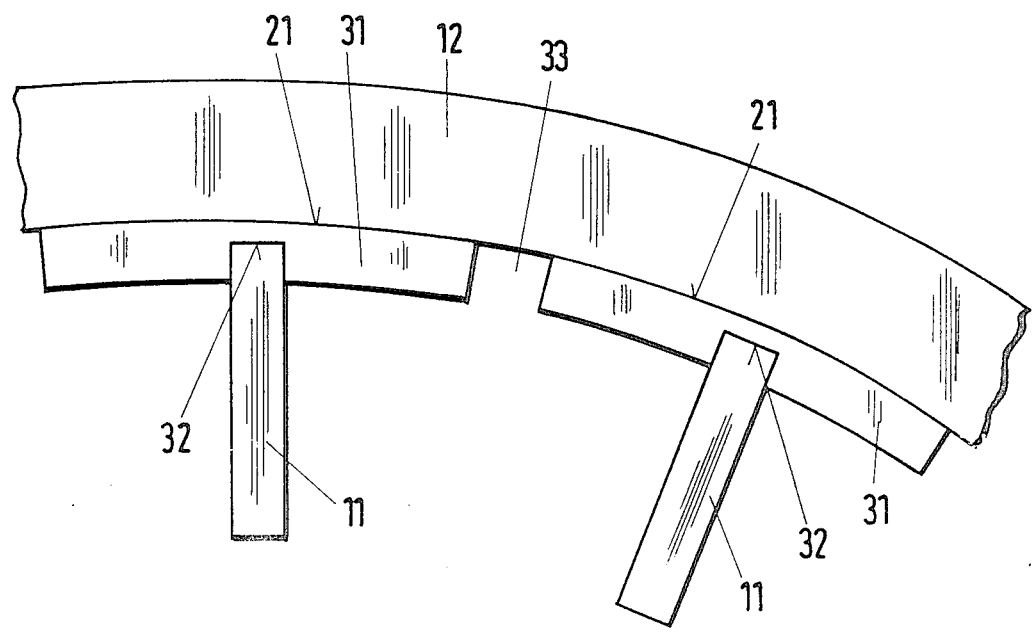
FIGS. 3 and 4 are elevational views of other embodiments of the spacers.
Figure 4:
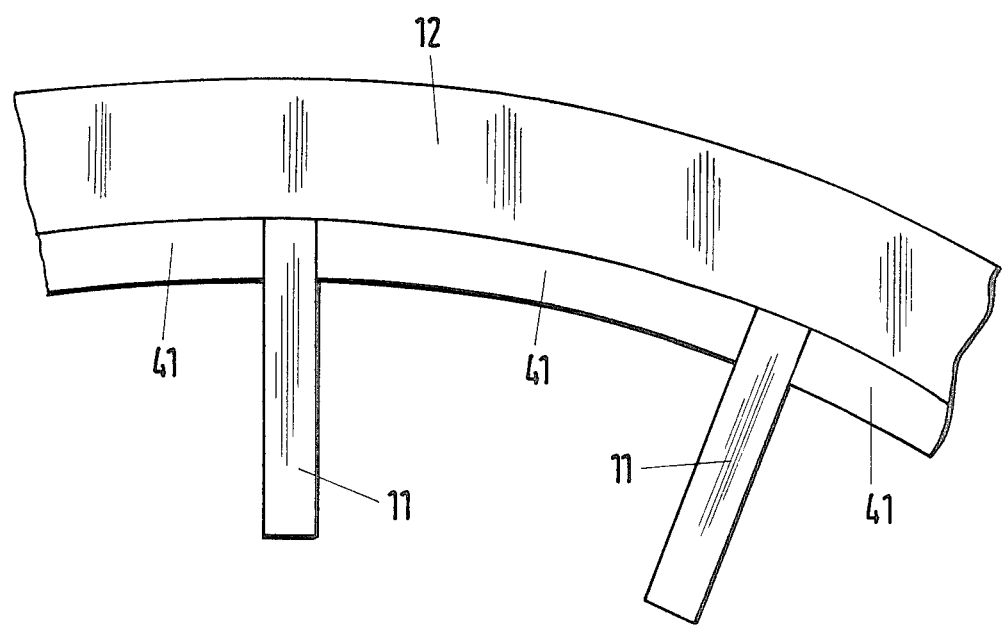

FIGS. 3 and 4 represent two variations of the embodiment of the segmental ring-shaped spacers. According to FIG. 3, spacers 31 have a slot 32 which points toward the center of curvature and extends in the axial direction, in which the respective support angle 11 is engaged. A space 33 is left between two spacers 31 so that the problem of division errors does not occur during production.

According to FIG. 4, ring segment-shaped spacers 41 are each disposed between two adjacent support angles 11. This construction is particularly well suited for an embodiment in which the spacers 41 are cemented or adhesively connected to the support ring 12 but not to the support angles 11, so that the end winding with the support angles 11 forms a movable unit, while the support ring 12 with the spacers 41 is bolted to the lamination body.

Figure 5:
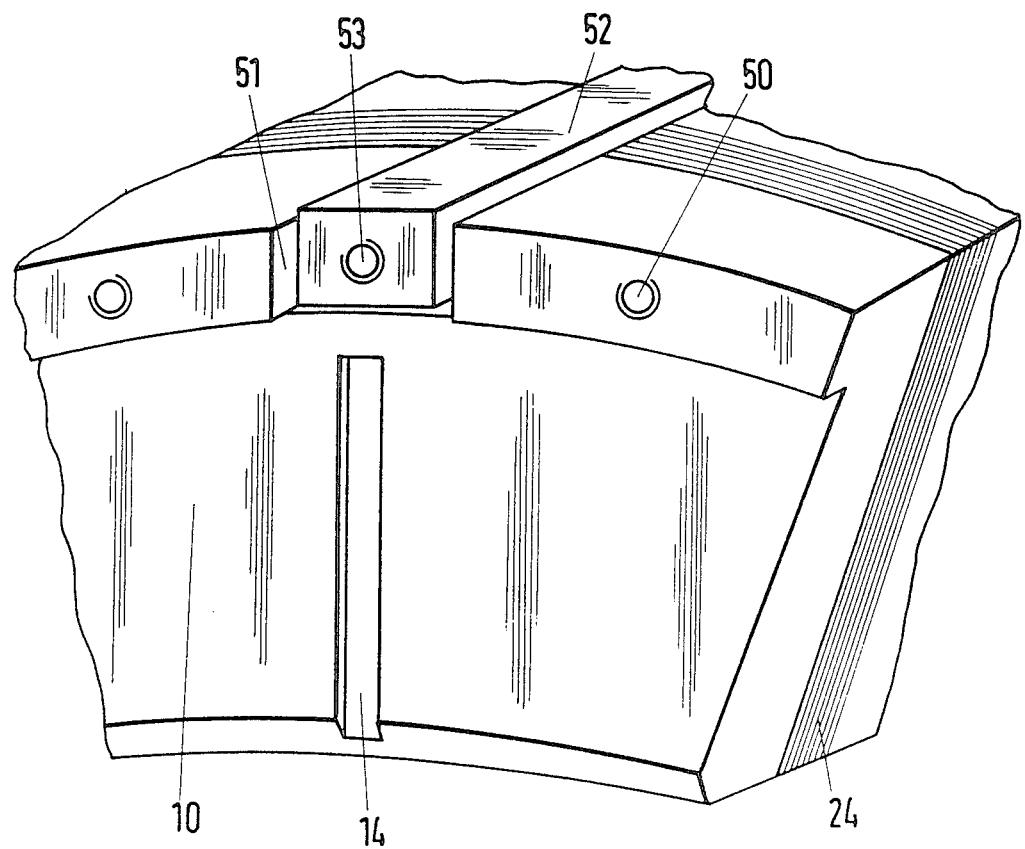
FIG. 5 is a fragmentary perspective view of part of a lamination body with a wedge carrier.

Besides a screw connection of the support ring 12 to the pressure plate 10 as shown in FIG. 2, an embodiment is also possible in which the support ring 12 is bolted to another part of the lamination body. Thus, a portion of the lamination body with an alternative fastening possibility is shown in the perspective view of FIG. 5. FIG. 5 again shows a portion of a pressure plate 10 with a slot 14 as well as several laminations of the lamination stack 24. In the radially outer part of the lamination body there is a wedge carrier 52 in a longitudinal slot 51, which serves for clamping the lamination stack 24. The wedge carrier 52 has a tapped hole 53 at the end surface thereof which serves as an alternative to a tapped hole for bolting the support ring which is not shown in FIG. 5.

The foregoing is a description corresponding in substance to German application No. P 36 10 265.2, dated Mar. 26, 1986, the International priority of which is being claimed for the instant application, and which is hereby made part of this application. Any material discrepancies between the foregoing specification and the aforementioned corresponding German application are to be resolved in favor of the latter.

We claim:

1. Apparatus for supporting conductor bars of an end winding of a stator winding of an electric machine having a lamination stack, comprising pressure plates holding the lamination stack together, support angles supporting the conductor bars in the vicinity of the end winding, a support ring being directly axially adjacent said pressure plate and having an inner periphery, said support angles having radially outer surfaces braced against said support ring, said support angles being guided and partially disposed in radially extending slots formed in said said pressure plates, and spacers in the shape of ring segments resting on said inner periphery of said support ring and preventing tangential deflection of said support angles, said pressure plate having a circular slot formed therein concentric with the axis of the electric machine, said spacers protruding at least partially into said circular slot, and said support angles, said spacers and said support ring being adhesively connected together to form a mechanical unit movable in the axial direction.

2. Apparatus according to claim 1, wherein one of said spacers is disposed between and rests against two adjacent support angles.

3. Apparatus according to claim 1, wherein one of said spacers has a surface facing the axis of the electric machine having an axial longitudinal slot formed therein, one of said support angles having a radially outwardly pointing part at least partly engaged in said axial longitudinal slot.

4. Appparatus according to claim 1, wherein said support angles are substantially flat.

5. Apparatus for supporting conductor bars of an end winding of a stator winding of an electric machine having a lamination stack, comprising pressure plates holding the lamination stack together, support angles supporting the conductor bars in the vicinity of the end winding and being movable in the axial direction, a support ring being directly axially adjacent said pressure plate, being bolted to the lamination body and having an inner periphery, said support angles having radially outer surfaces branched against said support ring, said support angles being guided and partially disposed in radially extending slots formed in said said pressure plates, and spacers in the shape of ring segments resting on said inner periphery of said support ring, being adhesively connected to said supporting ring and preventing tangential deflection of said support angles.

6. Appparatus according to claim 5, wherein said support angles are substantially flat.

* * * * *